(12) United States Patent
Takahara et al.

(10) Patent No.: US 8,082,817 B2
(45) Date of Patent: Dec. 27, 2011

(54) POWER TRANSMISSION MECHANISM

(75) Inventors: Shuhei Takahara, Himeji (JP); Shigeru Nishimura, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 364 days.

(21) Appl. No.: 12/382,163

(22) Filed: Mar. 10, 2009

(65) Prior Publication Data
US 2009/0229394 A1 Sep. 17, 2009

(30) Foreign Application Priority Data
Mar. 12, 2008 (JP) ................. P2008-062979

(51) Int. Cl.
*F16H 3/38* (2006.01)
(52) U.S. Cl. ...... 74/339; 192/69.71; 192/53.5; 192/108; 192/69.83; 74/331
(58) Field of Classification Search .............. 192/53.5, 192/69.83, 69.71, 108; 74/325, 329–331, 74/337.5
See application file for complete search history.

(56) References Cited

U.S. PATENT DOCUMENTS

| 2,950,797 | A | * | 8/1960 | Zieher | 192/108 |
| 4,307,797 | A | * | 12/1981 | Belansky | 192/108 |
| 6,595,078 | B2 | * | 7/2003 | Arakawa | 74/337.5 |
| 7,735,616 | B2 | * | 6/2010 | Nagahashi et al. | 192/69.8 |

FOREIGN PATENT DOCUMENTS
JP 10-61731 3/1998
* cited by examiner

*Primary Examiner* — David D Le
*Assistant Examiner* — Huan Le
(74) *Attorney, Agent, or Firm* — Wenderoth, Lind & Ponack, LLP

(57) ABSTRACT

A power transmission mechanism having a dog clutch for freely connecting and disconnecting power transmission between a first rotor and a second rotor on a common rotational shaft. The dog clutch has a plurality of dog jaws in one of the rotors and has, in the other rotor, a plurality of recess portions or other dog jaws to which the former dog jaws can be engaged. Tapered surfaces are formed at an end face of each of the former dog jaws in the axial direction and each of wall surface portions formed between the recess portions or an end face of each of the latter dog jaws.

6 Claims, 8 Drawing Sheets

US 8,082,817 B2

POWER TRANSMISSION MECHANISM

BACKGROUND OF THE INVENTION

1. Field of the Invention

The present invention relates to a power transmission mechanism having a dog clutch.

2. Description of the Related Art

As an example of a power transmission mechanism having a dog clutch, as disclosed in Japanese Unexamined Patent Publication No. 10-61731, there is a gear-type transmission mechanism for vehicle mounted on a motorcycle. As is well known, the gear-type transmission mechanism has a plurality of rotational shafts such as an input shaft for changing and an output shaft for changing. An input-side gear (rotor) for changing is fitted to the input shaft. An output-side gear (rotor) engaging with the input-side gear is fitted to the output shaft. For the shift operation, an appropriate gear for changing is spline fitted to the rotational shaft so as to be slidable in an axial direction, and a dog clutch is interposed between the slide-type gear and a play-type gear for changing that is rotatable relative to the rotational shaft and is engaged so as not to be moved in the axial direction. The dog clutch connects and disconnects (disconnectably connects) power transmission between the gears.

FIG. 10 illustrates a conventional dog clutch arranged between gears on an output shaft for changing of a gear-type transmission mechanism. In FIG. 10, an appropriate slide-type gear for changing 105 is spline fitted to an outer peripheral surface of an output shaft 100 so as to be slidable in an axial direction. A play-type gear for changing 106 is rotatably fitted to the output shaft 100 via a bearing member 109 and is engaged by an engaging ring 107 or the like in an axial direction. A dog clutch C0 for disconnecting power transmission between the gears 105 and 106 is interposed between the gears 105 and 106.

The dog clutch C0 has a plurality of the dog jaws 111 and a plurality of engaging holes (recess portions) 112. The dog jaws 111 are formed in a ring body 110 integrally formed with the slide-type gear 105 at equal spaces in a circumferential direction and are protruded toward the play-type gear 106 in an axial direction. The engaging holes 112 of the same number as that of the dog jaws 111 or of the number of an integral multiple of the dog jaws 111 are formed in an arm wall 113 of the play-type gear 106. A shift fork 121 moved by a change drum (not shown) in an axial direction of the shift fork supporting shaft (not shown) engages in an annular groove 120 of the slide-type gear 105. The slide-type gear 105 is moved by the shift fork 121 toward the play-type gear 106 in the axial direction of the output shaft 100 (in a direction of an arrow F1) to engage each of the dog jaws 111 in each of the engaging holes 112 for connecting the gears 105 and 106 so as to transmit power. In such a conventional dog clutch C0, an end face 111a of the each dog jaw 111 in the axial direction and a wall surface 113a of the play-type gear 106 on the slide-type gear 105 side are formed in a planar shape substantially perpendicular to an output axis O.

When the dog clutch C0 of FIG. 10 is connected, as described above, the slide-type gear 105 is moved in the direction of the arrow F1 to fit each of the dog jaw 111 into each of the engaging hole 112 for engagement. In the moving process, each of the dog jaw 111 may be directly fitted into each of the engaging hole 112 without being abutted on the wall surface 113a. However, in more than half the number of shift operations, the end face 111a of the dog jaw 111 is once abutted on the wall surface 113a. Thereafter, by the relative rotating between the gears 105 and 106 in a circumferential direction, each of the dog jaws 111 is fitted into each of the engaging holes 112 and is then moved in the direction of the arrow F1 so as to be brought into a complete clutch connection state. That is, when the abutment of the dog jaw 111 occurs while the slide-type gear 105 is moved, the rotation of the change drum and the movement of the slide-type gear 105 will be once stopped.

However, when the dog jaw 111 is abutted on the wall surface 113a, misalignment corresponding to a gap in the radial direction between an inner peripheral spline of the slide-type gear 105 and an outer peripheral spline 101 of the output shaft 100 occurs in the slide-type gear 105 and the slide-type gear 105 is slightly inclined. Thereby, the sliding resistance of the spline fitted portion is increased due to the misalignment and inclination. Moreover, when the dog jaw 111 is fitted into the engaging hole 112 and the dog jaw 111 and the edge of the engaging hole 112 in a circumferential direction are pressed into contact with each other, the sliding resistance is increased. Due to the increase in the sliding resistance, the dog jaw 111 can be stopped before the clutch is completely connected. Thus, half-engagement and jump out of gear can occur, and moreover, the shift operation becomes heavy.

FIG. 9 illustrates a variation of the rotational angle of the change drum with time in an absence of the abutment of the dog jaw (an imaginary line graph X1) and a variation of the rotational angle of the change drum with time when half-engagement occurs through the abutment of the dog jaw (a solid line graph X2).

The graph X1 is an example in which the change drum is rotated without being stopped, from a second gear position (+30°) indicated by a reference numeral P1 to a third gear position indicated by a reference numeral P2 in the absence of the abutment of the dog jaw. In a case where the clutch is connected through the abutment state of the dog jaw, as illustrated in the graph X2, when the dog jaw is abutted at a position P3 (around −15°) during shifting, the gears are shifted relatively in a circumferential direction so that the dog jaw is fitted into the engaging hole. The sliding resistance of the splined portion due to the misalignment is increased, and the change drum is stopped at a position P4 before a third gear position P5. Thereby, half-engagement is continued for a fixed period of time T1.

SUMMARY OF THE INVENTION

The present invention has been made in view of the above problems and an object of the present invention is to provide a power transmission mechanism that can readily perform a dog clutch connecting operation by reducing a shift operation load and an occurrence rate of half-engagement by improving a shape of a dog jaw.

In order to accomplish the foregoing object of the present invention, there is in accordance with the present invention provided a power transmission mechanism that has a rotational shaft, a first rotor spline fitted to an outer peripheral surface of the rotational shaft so as to be slidable in an axial direction of the rotational shaft, a second rotor rotatably fitted to an outer peripheral surface of the rotational shaft and fixed in the axial direction, and a dog clutch for freely connecting and disconnecting power transmission between the rotors by sliding of the first rotor in the axial direction, wherein the dog clutch has a plurality of dog jaws in one of the rotors and has, in the other rotor, a plurality of recess portions or other dog jaws to which the former dog jaws can be engaged, and taper surfaces about a rotational axis corresponding to each other are formed to an end face of each of the former dog jaws in the axial direction and each of wall surface portions formed between the recess portions or an end face of each of the latter other dog jaws in the axial direction.

With this configuration, even if the dog jaw is abutted on the wall surface between the recess portions during the dog clutch connecting operation, an aligning function by the abutment of the taper surface at the end of the dog jaw and the taper surface of the wall between the engaging recesses can prevent the misalignment of a slide-type gear relative to the rotational shaft and can reduce the inclination of the slide-type gear. A sliding resistance and catching of the spline fitted portion between the slide-type gear and the rotational shaft can be reduced. Thus, comfortability and readiness of the clutch operation can be improved. Occurrence of half-engagement of the dog clutch can be reduced and slipping and idle rotation of the rotor can be prevented.

In the present invention, preferably, taper angles of the taper surfaces are set in a range of 90° to 160°. More preferably, taper angles of the taper surfaces are set to approximately 140°.

With this configuration, the aligning function can be sufficiently exhibited and a hang-up phenomenon of the taper surfaces can be avoided. When the taper angles are too large, the aligning function is lowered. When the taper angles are too small, the frictional resistance between the taper surfaces is too large so that the dog jaws may hang up.

In the present invention, preferably, the taper surface of the first rotor and the taper surface of the second rotor can be formed in a shape extended along a peripheral surface of a cone, a shape extended along a spherical surface about the rotational axis, a shape extended along a parabolic rotor about the rotational axis, or a shape extended along a hyperbola rotor about the rotational axis.

In the present invention, preferably, the taper surface of the first rotor having a shape extended along a peripheral surface of a cone is formed in a shape inclined toward the second rotor outwardly in a radial direction about the rotational axis, wherein the taper surface of the second rotor having a shape extended along a peripheral surface of a cone is formed in a shape inclined outwardly in the radial direction about the rotational axis so as to be moved away from the first rotor.

In the present invention, preferably, a chamfering portion substantially perpendicular to the rotational shaft is formed outwardly of the taper surface in a diameter direction.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

FIGS. 1 to 8 illustrate a gear-type transmission mechanism for motorcycle having a plurality of dog clutches of an embodiment of a power transmission mechanism according to the present invention. The embodiment of the present invention will be described with reference to the drawings.

Figure 1:
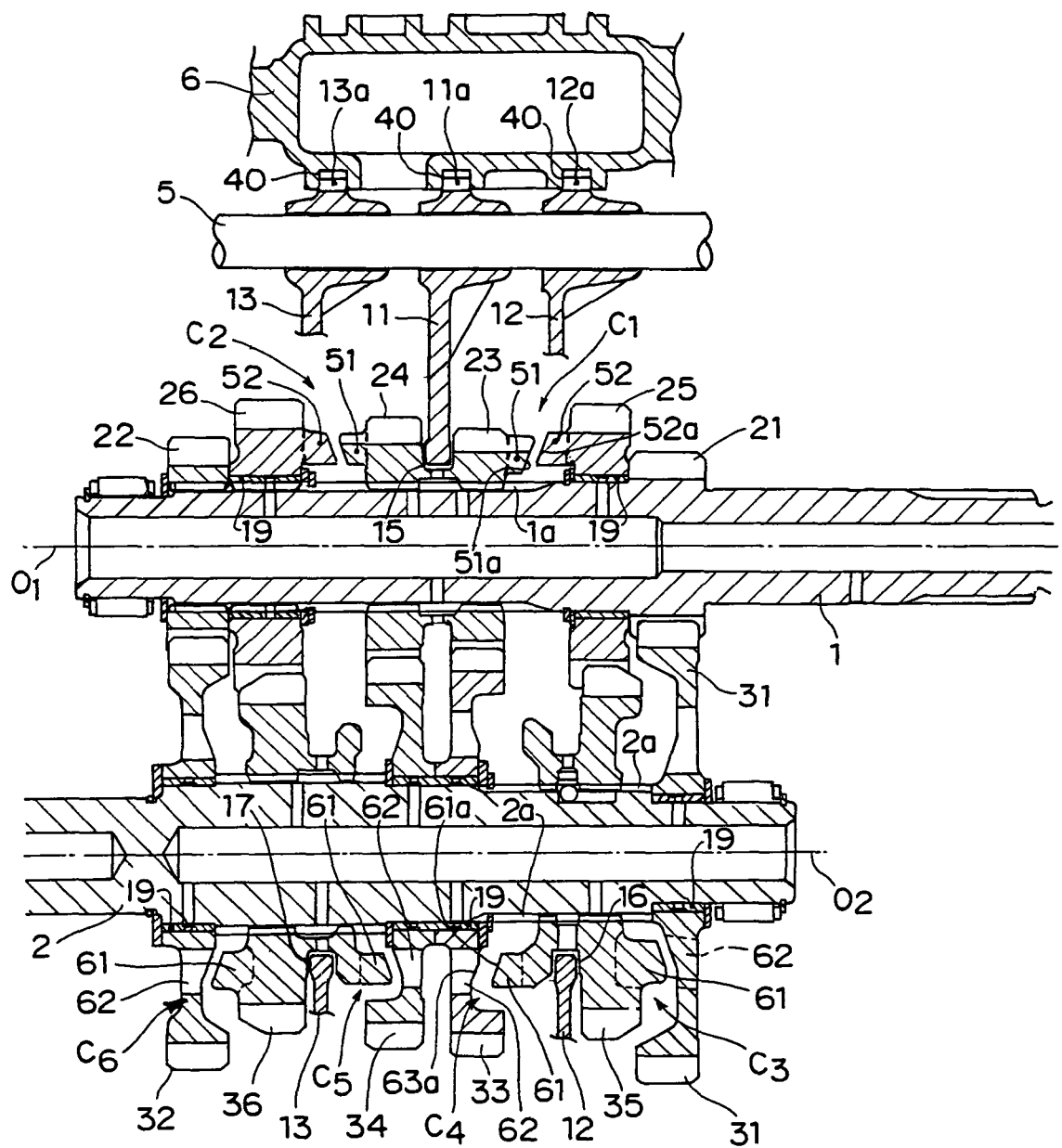
FIG. 1 is a sectional developed view of a gear-type transmission mechanism for motorcycle of an embodiment of a power transmission mechanism according to the present invention.

FIG. 1 is a sectional developed view by cutting and developing an inner configuration of a gear-type transmission mechanism along a cross section passing through the respective axes of an input shaft 1 for changing (an example of a rotational shaft), an output shaft 2 for changing (an example of the rotational shaft), a shift fork supporting shaft 5, and a change drum 6. In FIG. 1, the input shaft 1 for changing, the output shaft 2 for changing, the shift fork supporting shaft 5, and the change drum 6 are arranged in a transmission case (not shown) so as to be parallel with each other. The input shaft 1 has one end (a right end in the drawing) coupled to a crankshaft (not shown) of an engine via a multiple disc friction clutch device (not shown) and receives, as an input, a rotational force of the crankshaft. The output shaft 2 has one end (a left end in the drawing) coupled to a rear wheel of a motorcycle via a chain-type power transmission mechanism (not shown).

The input shaft 1 has, on its outer peripheral surface, a first input-side gear 21 for first speed stage, a second input-side gear 22 for second speed stage, a third input-side gear 23 for third speed stage, a fourth input-side gear 24 for forth speed stage, a fifth input-side gear 25 for fifth speed stage, and a sixth input-side gear 26 for sixth speed stage. The first input-side gear 21 arranged at the right end is integrally formed with the input shaft 1. The second input-side gear 22 arranged at the left end is spline fitted to the input shaft 1 and is fixed in the axial direction of the input shaft 1. The fifth input-side gear 25 and the sixth input-side gear 26 are, as play-type gears (corresponding to a second rotor of the claims), fitted to the input shaft 1 via a bushing (an example of a bearing member) so as to be relatively rotatable and are engaged in the axial direction, respectively. The third input-side gear 23 and the fourth input-side gear 24 are formed so as to be integral with each other, and are, as slide-type gears (corresponding to a first rotor of the claims), spline fitted to an outer peripheral splined portion 1a of the input shaft 1 so as to be movable in the axial direction. An example of a method of manufacturing the input-side gears 21 to 26 will be described. Forged splines, gear teeth, taper surfaces, and the like are cut and are then subjected to a surface treatment to manufacture the input-side gears 21 to 26. As the surface treatment, the surfaces are hardened by appropriate hardening means, such as carburizing and quenching, induction hardening, carbonitriding hardening, or the like. Non-hardened gears can also be used.

The output shaft 2 has, on its outer peripheral surface, a first output-side gear 31 for first speed stage, a second output-side gear 32 for second speed stage, a third output-side gear 33 for third speed stage, a fourth output-side gear 34 for forth speed stage, a fifth output-side gear 35 for fifth speed stage, and a sixth output-side gear 36 for sixth speed stage. The first output-side gear 31, the second output-side gear 32, the third output-side gear 33, and the fourth output-side gear 34 are, as play-type gears, fitted to the output shaft 2 via a bushing so as to be relatively rotatable and are engaged so as not to be moved in the axial direction. The fifth output-side gear 35 and the sixth output-side gear 36 are, as slide-type gears, spline fitted to an outer peripheral splined portion 2a of the output shaft 2 so as to be movable in the axial direction. As in the input-side gears 21 to 26, in a method of manufacturing the output-side gears 31 to 36, forged splines, gear teeth, taper surfaces, and the like are cut and are then subjected to a surface treatment to manufacture the output-side gears 31 to 36. As the surface treatment, the surfaces are hardened by appropriate hardening means, such as carburizing and quenching, induction hardening, carbonitriding hardening, or the like. Non-hardened gears can also be used.

A first dog clutch C1 and a second dog clutch C2 for disconnectably connecting the gears are provided between the fifth input-side gear 25 and the third input-side gear 23 and between the fourth input-side gear 24 and the sixth input-side gear 26 on the input shaft 1, respectively. On the other hand, a third dog clutch C3, a fourth dog clutch C4, a fifth dog clutch C5, and a sixth dog clutch C6 for disconnectably connecting the gears are provided between the first output-side gear 31 and the fifth output-side gear 35, between the fifth output-side gear 35 and the third output-side gear 33, between the fourth output-side gear 34 and the sixth output-side gear 36, and between the sixth output-side gear 36 and the second output-side gear 32 on the output shaft 2, respectively.

An annular groove 15 for engaging a shift fork is formed in the integrated gear including the third input-side gear 23 and the fourth input-side gear 24 on the input shaft 1. An input-side shift fork 11 engages in the annular groove 15. By the movement of the input-side shift fork 11 in an axial direction of the shift fork support shaft 5, the third input-side gear 23 and the fourth input-side gear 24 can be integrally slid in the axial direction of the input shaft 1.

Annular grooves 16 and 17 for engaging shift forks are formed in the fifth output-side gear 35 and the sixth output-side gear 36 on the output-shaft 2. Output-side shift forks 12 and 13 engage in the annular grooves 16 and 17, respectively. By the movement of the shift forks 12 and 13 in the axial direction of the shift fork supporting shaft 5, the fifth output-side gear 35 and the sixth output-side gear 36 can be slid in the axial direction of the output shaft 2.

The shift forks 11, 12, and 13 are movably supported by the shift fork supporting shaft 5 in an axial direction. Driving pins 11a, 12a, and 13a of the shift forks 11, 12, and 13 engage with cam grooves 40 formed in an outer peripheral surface of the change drum 6.

The change drum 6 is coupled to a change pedal via a swinging arm-type drum driving mechanism (not shown) and a change shaft (not shown), and is rotated by a predetermined amount of rotation by a depressing or raising operation of the change pedal. The shift forks 11, 12, and 13 can be selectively moved in the axial direction of the shift fork supporting shaft 5. For example, the change drum 6 is rotated 60° between the first to sixth gear positions by one gear position. A neutral position is set between the first and second gear positions.

Among the first to sixth dog clutches C1 to C6, the first dog clutch C1 and the second dog clutch C2 on the input shaft 1 have a configuration using the engagement of first dog jaws 51 and second dog jaws 52. On the other hand, the third to sixth dog clutches C3 and C6 on the output shaft 2 have a configuration using the engagement of dog jaws 61 and engaging holes (recess portions) 62.

[The Configuration of the Dog Clutch C4 Using the Engagement of the Dog Jaw 61 and the Engaging Hole 62]

Figure 2:
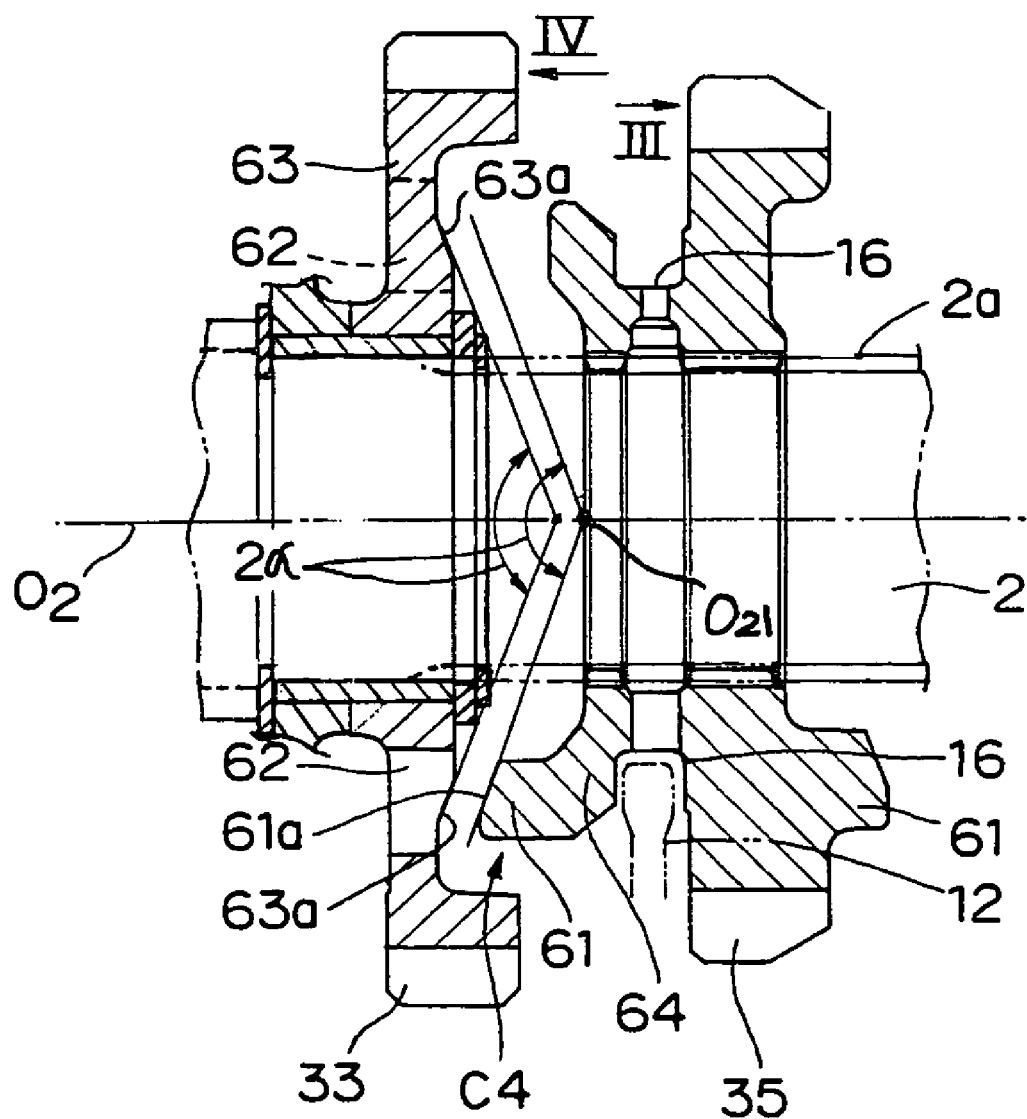
FIG. 2 is an enlarged view of a fourth dog clutch C4 of FIG. 1.
Figure 3:
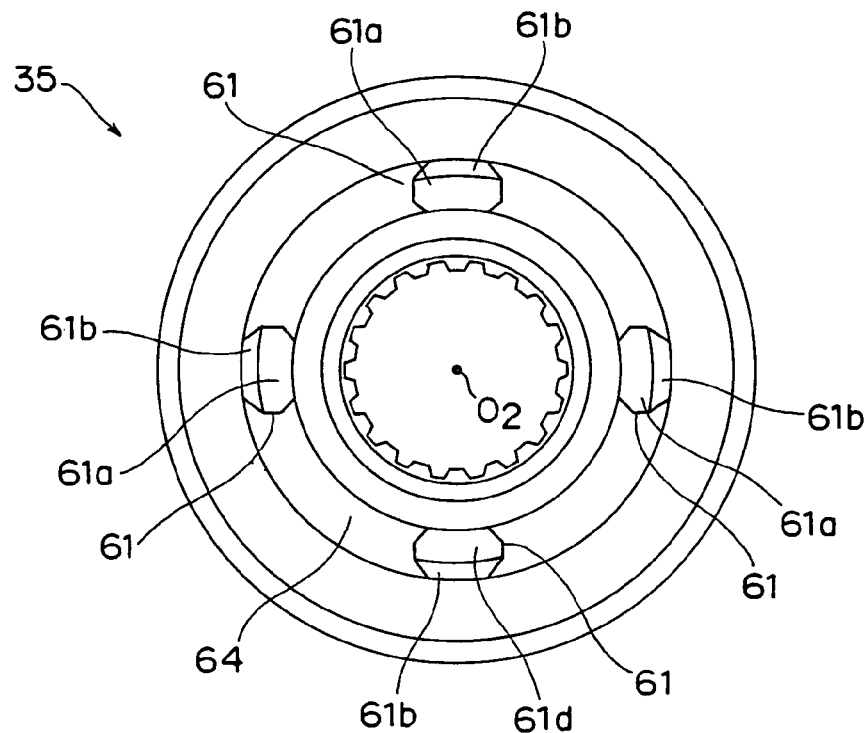
FIG. 3 is a view of a fifth output-side gear 35 of FIG. 2, seen in a direction of an arrow III.
Figure 4:
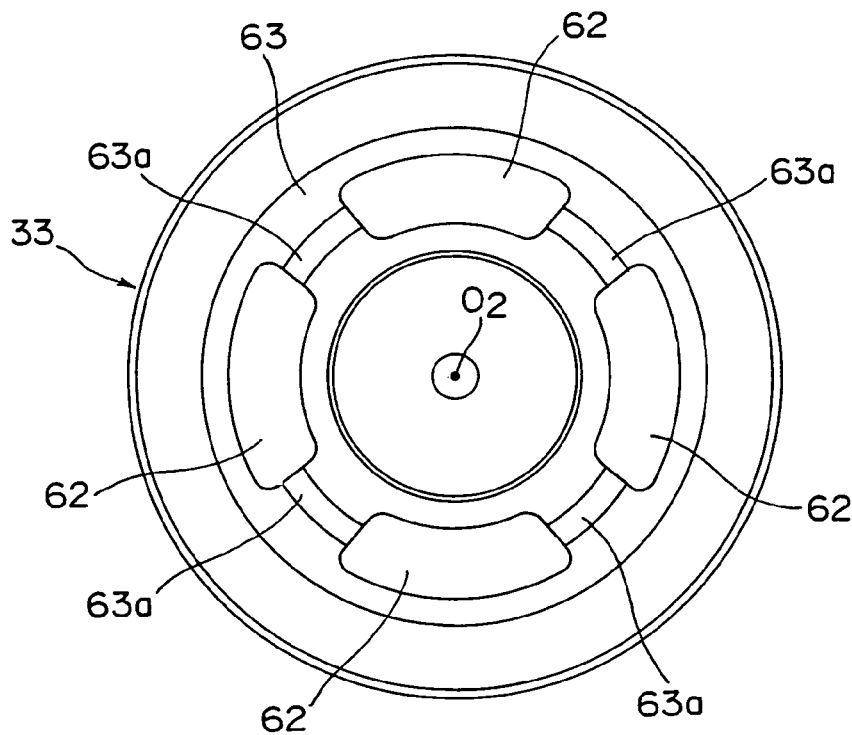
FIG. 4 is a view of a third output-side gear 33 of FIG. 2, seen in a direction of an arrow IV.

FIG. 2 is an enlarged view of the fourth dog clutch C4 on the output shaft 2. FIG. 3 is a view of the fifth output-side gear 35 of FIG. 2, seen in a direction of an arrow III. FIG. 4 is a view of the third output-side gear 33 of FIG. 2, seen in a direction of an arrow IV. The detail of the dog clutch using the engagement of the dog jaws 61 and the engaging holes 62 will be described with reference to these drawings.

As for the fourth dog clutch C4 of FIG. 2, a ring body 64 is integrally formed via the annular groove 16 on a rear surface (a surface on the third gear 33 side in an axial direction) of the fifth output-side gear 35. A plurality of the dog jaws 61 protruded toward the third output-side gear 33 in the axial direction is formed in the ring body 64 at equal spaces in a circumferential direction. An end face 61a of each of the dog jaws 61 is inclined toward the third output-side gear 33 outwardly in a radial direction about a center point (top) O21 positioned on an output axis O2 and is formed as a taper surface (conical surface) extended along a peripheral surface of a cone with the output axis O2 as a center line. A taper angle (so-called apex angle) $2\alpha$ of the taper end face 61a about the center point O21 is set in the range of 90° to 160°. In the embodiment, the taper angle $2\alpha$ is set to approximately 140°. The engaging holes 62 of the same number as that of the dog jaws 61 or of the number of an integral multiple of the dog jaws 61 have a size into which the dog jaws 61 are fitted (engaged). The engaging holes 62 are formed in an arm wall 63 of the third output-side gear 33 at equal spaces in a circumferential direction. Each of wall surface portion 63a between the engaging holes 62 of the arm wall 63 are arranged at equal spaces in the circumferential direction on the dog jaw 61 side is formed to the taper surface having the taper angle $2\alpha$ corresponding to the taper angle $2\alpha$ of the taper end face 61a of the dog jaw 61.

In FIG. 3, the dog jaws 61 formed in the fifth output-side gear 35 are arranged in four positions at equal spaces in a circumferential direction of the fifth output-side gear 35. A chamfering portion 61b substantially perpendicular to the output axis O2 is formed outwardly of the taper end face 61a in a radial direction of the fifth output-side gear 35.

In FIG. 4, the engaging holes 62 formed on the third output-side gear 33 are arranged in four positions at equal spaces in a circumferential direction of the third output-side gear 33 corresponding to the dog jaws 61. A length of the engaging hole 62 in a circumferential direction is formed so as to be longer than a length of the dog jaw 61 in a circumferential direction.

The third dog clutch C3, the fifth dog clutch C5, and the sixth dog clutch C6 on the output shaft 2 of FIG. 1 have a similar configuration as that of the fourth dog clutch C4.

[The Configuration of the Dog Clutch Using the Engagement of the Dog Jaws 51 and Dog Jaws 52]

Figure 5:
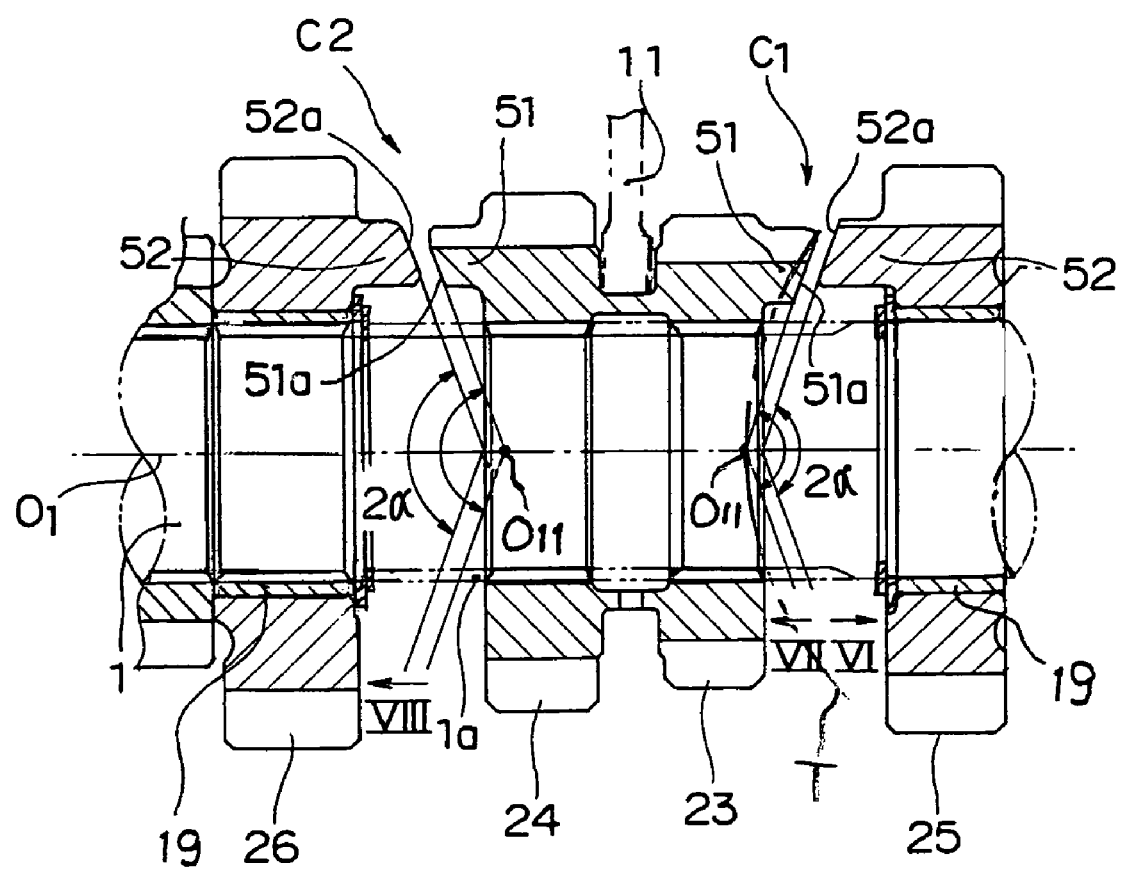
FIG. 5 is an enlarged view of a first dog clutch C1 and a second dog clutch C2 of FIG. 1.
Figure 6:
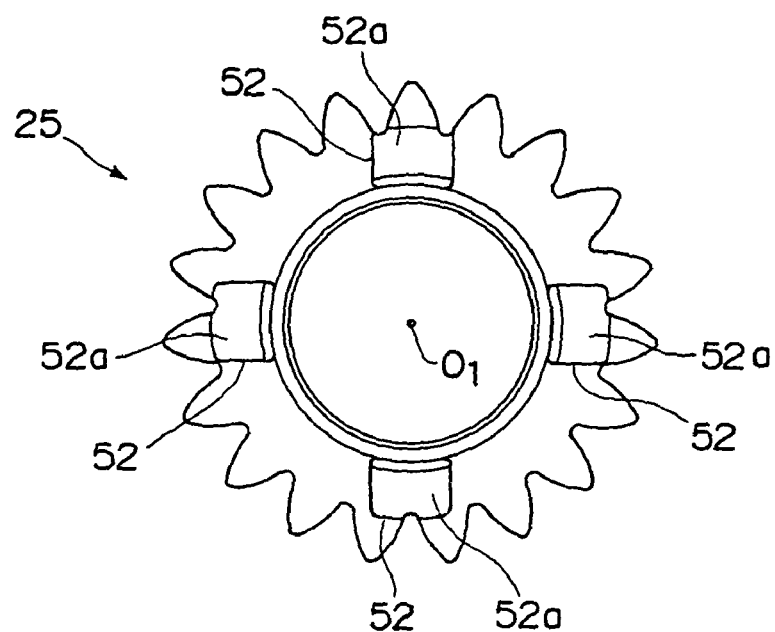
FIG. 6 is a view of a fifth input-side gear 25 of FIG. 5, seen in a direction of an arrow VI.
Figure 7:
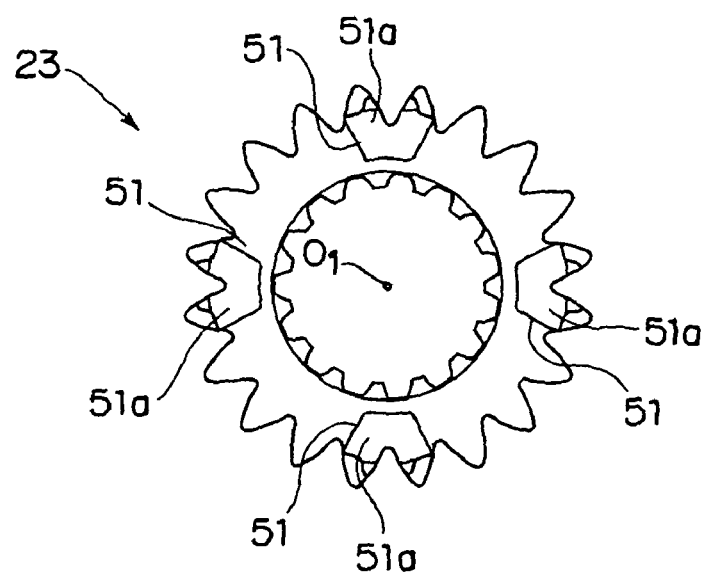
FIG. 7 is a view of a third input-side gear 23 of FIG. 5, seen in a direction of an arrow VII.
Figure 8:
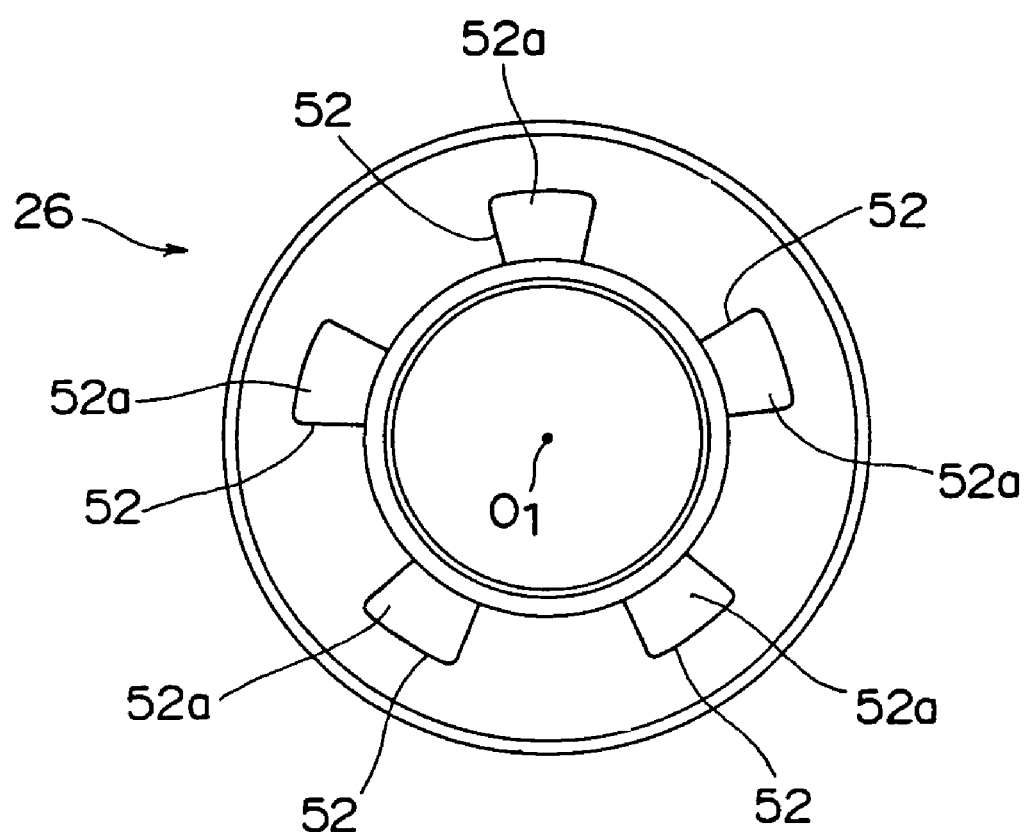
FIG. 8 is a view of a sixth input-side gear 26 of FIG. 5, seen in a direction of an arrow VIII.
Figure 9:
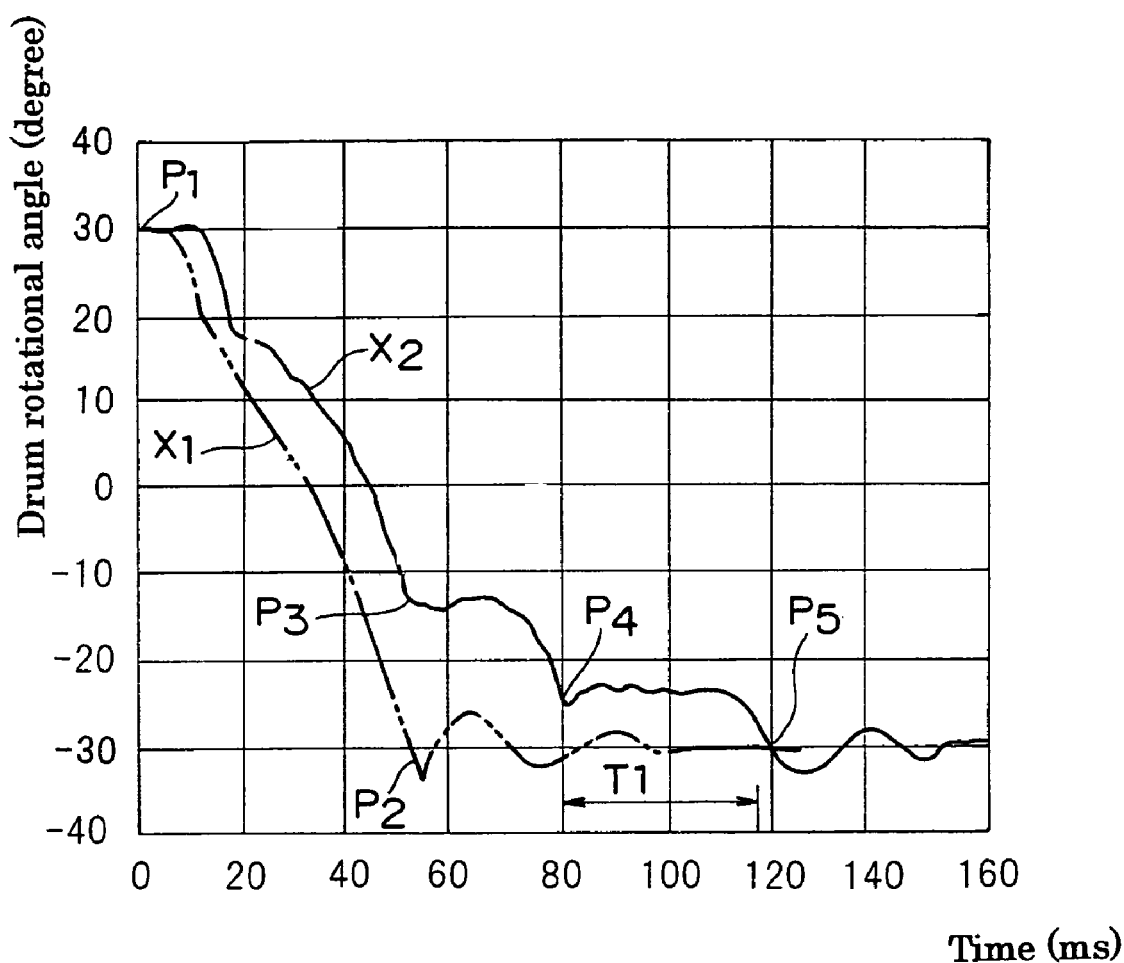
FIG. 9 is a graph illustrating a variation of a rotational angle of a change drum of a gear-type transmission mechanism with time.

FIG. 5 is an enlarged view of the dog clutch C1 between the fifth input-side gear 25 and the third input-side gear 23 on the input shaft 1 and the dog clutch C2 between the fourth input-side gear 24 and the sixth input-side gear 26 on the input shaft 1. FIG. 6 is a view of the fifth input-side gear 25 of FIG. 5, seen in a direction of an arrow VI. FIG. 7 is a view of the third input-side gear 23 of FIG. 5, seen in a direction of an arrow VII. FIG. 8 is a view of the sixth input-side gear 26 of FIG. 5, seen in a direction of an arrow VIII. The detail of the dog clutch using the engagement of the dog jaws 51 and 52 will be described with reference to these drawings.

As for the first dog clutch C1 of FIG. 5, a plurality of the first dog jaws 51 protruded toward the fifth input-side gear 25 in the axial direction of the input shaft 1 is arranged in the wall surface of the fifth input-side gear 25 side of the third input-side gear 23 at equal spaces in a circumferential direction of the third input-side gear 23. An end face 51a of each of the dog jaws 51 is inclined toward the fifth input-side gear 25 outwardly in a radial direction about a center point (top) O11 positioned on an input axis O1 and is formed as a taper surface (conical surface) extended along a peripheral surface of a cone with the input axis O1 as a center line. The taper angle (so-called apex angle) $2\alpha$ of the taper end face 51a about the center point O11 is set in the range of 90° to 160°. In the embodiment, the taper angle $2\alpha$ is set to approximately 140°. On the other hand, a plurality of the second dog jaws 52 protruded toward the third input-side gear 23 in the axial direction of the input shaft 1 is also formed in the wall surface of the third input-side gear 23 side of the fifth input-side gear 25 at equal spaces in a circumferential direction of the fifth input-side gear 25. An end face 52a of each of the second dog jaws 52 is formed to the taper surface having the taper angle $2\alpha$ corresponding to the taper angle $2\alpha$ of the taper end face 51a of the first dog jaw 51.

Note that the second dog clutch C2 on the input shaft 1 has a similar configuration as that of the first dog clutch C1. As illustrated in FIG. 8, the dog jaws 52 formed in the sixth input-side gear 26 are formed in five positions at equal spaces in a circumferential direction.

(Operation)

In shifting, the change pedal is depressed or raised so as to rotate 60° (or 30°) the change drum 6 of FIG. 1 via the swinging arm-type drum driving mechanism. By doing so, the shift forks 11, 12, and 13 are selectively moved via the cam grooves 40 in the axial direction of the sift fork supporting shaft 5 to connect, of the dog clutches C1 to C6, the dog clutch necessary for the desired gear position.

In shifting to the third gear position, for example, the fifth output-side gear 35 of FIG. 1 is moved leftward in the axial direction of the output shaft 2 to connect the fourth dog clutch C4. In this case, the power transmission path is in order of the input shaft 1, the third input-side gear 23, the third output-side gear 33, the fourth dog clutch C4, the fifth output-side gear 35, and the output shaft 2.

In the shift operation, the fifth output-side gear 35 illustrated in FIG. 2 is pushed by the shift fork 12 and is then moved to the third output-side gear 33 in the axial direction of the output shaft 2. Each of the dog jaws 61 is fitted into each of the engaging holes 62 for engagement to connect the fourth dog clutch C4. Aside from such a state, while the dog jaws 61 are moved, each of the dog jaws 61 is abutted on the arm wall 63 without being directly fitted into each of the engaging holes 62. After an elapse of a fixed period of time, the dog jaws 61 may be fitted into the engaging holes 62 due to the phase shifting of the gears 35 and 33 in a rotational direction (circumference direction). That is, as described above, the dog clutch may be connected through the abutment of the dog jaws. Upon the abutment of the dog jaws, the taper end face 61a of the dog jaw 61 and the taper wall surface 63a of the arm wall 63 are abutted on each other. By the taper fitting function, the fifth output-side gear 35 is aligned so that its axis can coincide with the output axis O2. Thereby, the misalignment of the fifth output-side gear 35 can be prevented, and the inclination of the fifth output-side gear 35 can be reduced. The fifth output-side gear 35 can reduce the sliding resistance of the spline fitted portion and is moved to the complete clutch connection position smoothly and readily without being stopped in half-engagement. As a result, the rotational speed of the change drum 6 can be improved to shorten time for the shift operation.

In shifting to the fifth gear position, in FIG. 1, the third input-side gear 23 is moved to the fifth input-side gear 25 in the axial direction of the input shaft 1 to connect the first dog clutch C1. In this case, the power transmission path is in order of the input shaft 1, the third input-side gear 23, the first dog clutch C1, the fifth input-side gear 25, the fifth output-side gear 35, and the output shaft 2.

In the shift operation, the third input-side gear 23 illustrated in FIG. 5 is pushed by the shift fork 11 and is then moved to the fifth input-side gear 25 in the axial direction of the input shaft 1. The first dog jaws 51 of the third input-side gear 23 and the second dog jaws 52 of the fifth input-side gear 25 engage with each other in the circumferential direction to connect the first dog clutch C1. Aside from such a state, the taper end faces 51a of the first dog jaws 51 and the taper end faces 52a of the second dog jaws 52 are abutted on each other. After an elapse of a fixed period of time, the dog jaws 51 and 52 may engage with each other due to the phase shifting of the gears 23 and 25 in the rotational direction (the circumference direction). That is, as described above, the first dog clutch C1 may be connected through the abutment of the dog jaws. In such a case, as described in the fourth dog clutch C4, by the taper fitting function of the taper end faces 51a of the dog jaw s51 and the taper end faces 52a of the dog jaws 52, the third input-side gear 23 as the slide-type gear is aligned so that its axis can coincide with the input axis O1. Thereby, the misalignment of the third input-side gear 23 can be prevented, and the inclination of the third input-side gear 23 can be reduced. The third input-side gear 23 can reduce the sliding resistance of the spline fitted portion and is moved to the complete clutch connection position smoothly and readily without being stopped in half-engagement. As a result, the rotational speed of the change drum 6 can be improved to shorten time for the shift operation.

Note that, by the aligning function of the taper fitting, the second dog clutch C2, the third dog clutch C3, the fifth dog clutch C5, and the sixth dog clutch C6 can be connected readily and smoothly so as to hardly cause half-engagement.

Figure 10:
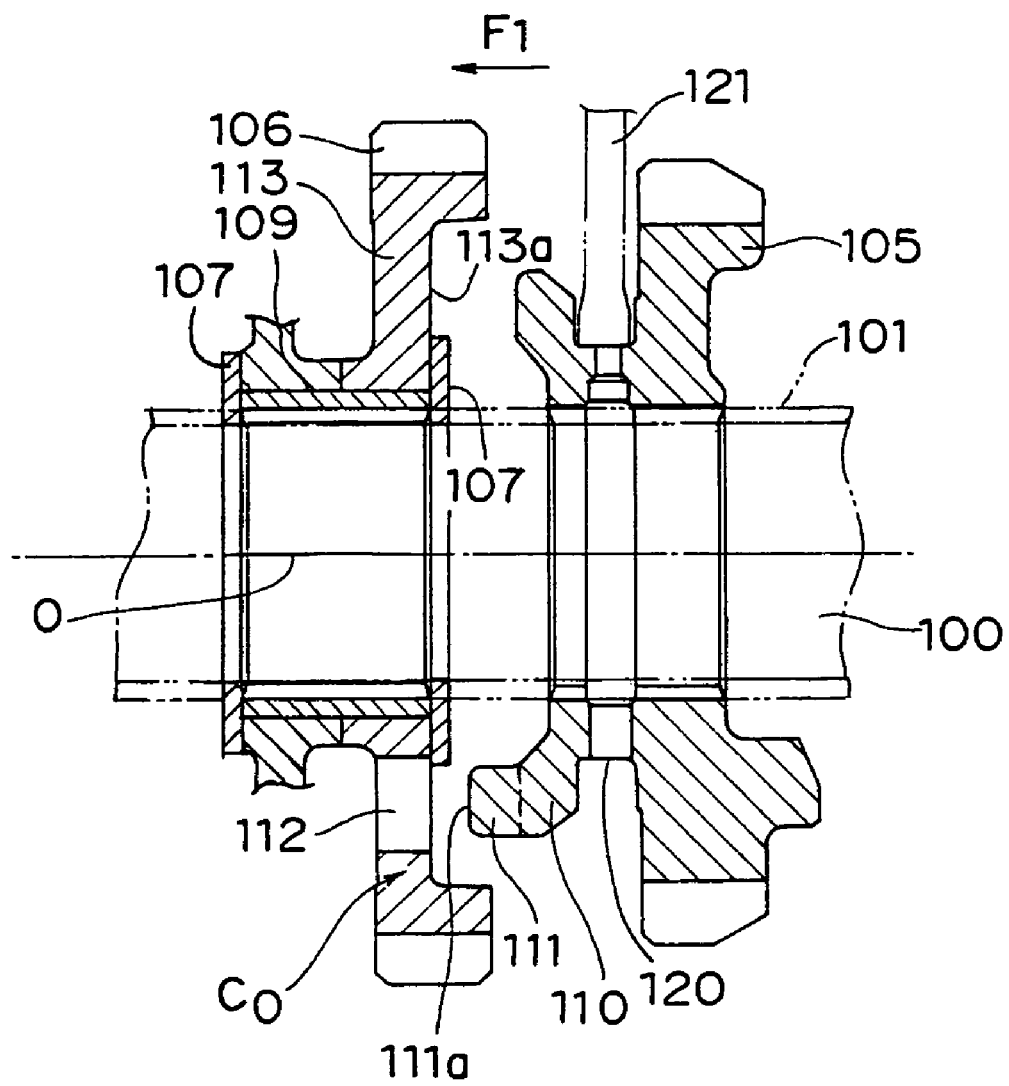
FIG. 10 is a cross-sectional view of a related art.

According to the embodiment, the number of occurrences of half-engagement is reduced to approximately 60% of that of a conventional dog clutch of FIG. 10. When the taper angle $2\alpha$ of the taper end face 61a is set to approximately 140°, the aligning function can be exhibited without increasing the frictional resistance on the taper fitting surface that much.

Other Embodiments (1) In the dog clutch using the engagement of the dog jaw and the engaging hole as illustrated in FIG. 2, the inclinations of the taper surfaces formed to the dog jaws 61 and the wall surface 63a can be reversed. In other words, the taper end face 61a of the dog jaw 61 can also be inclined outwardly in a diameter direction so as to be moved away from the engaging hole 62.

(2) In the dog clutch using the engagement of the dog jaws as illustrated in FIG. 5, the inclination of the taper end face formed to each of the dog jaws can be reversed. For example, the taper end face 51a of the first dog jaw 51 can also be inclined outwardly in a diameter direction so as to be moved away from the second dog jaw 52.

(3) When the present invention is applied to the gear-type transmission mechanism having the plurality of dog clutches as illustrated in FIG. 1, without adopting the taper fitting configuration in all the dog clutches C1 to C6, the taper fitting configuration of the present invention can be employed in the dog clutch that can easily cause half-engagement, e.g., in only the dog clutch between the gears having a high rotational speed.

(4) The present invention is not limited to the gear-type transmission mechanism for motorcycle as illustrated in FIG.

1 and is applicable to a gear-type transmission mechanism for other vehicles, a speed reducing mechanism for ship, or a speed reducing mechanism of a machine tool, installed equipment, and the like.

(5) In the above embodiments, the first and second rotors fitted to the rotational shafts are the gears for changing and are applicable to rotation pulleys or sprockets of a belt-type or chain-type transmission mechanism. Moreover, in place of the engaging hole penetrated in an axial direction, a recess portion having a bottom wall can be formed as in the above embodiments.

(6) When the dog clutch is configured by the dog jaw and the recess portion, the recess portion can be provided in the first rotor spline fitted to the outer peripheral surface of the rotational shaft so as to be slidable in an axial direction and the dog jaw can be provided in the second rotor rotatably fitted to the outer peripheral surface of the rotational shaft and engaged in an axial direction.

(7) In the present invention, the taper surfaces formed to the end face of the dog jaw and the wall surface between the recess portions may have, in addition to a shape extended along a peripheral surface of a cone, a shape extended along a spherical surface about a rotational axis (as shown by a two dot chain line T in FIG. 5). Further, the taper surfaces formed to the end face of the dog jaw and the wall surface between the recess portions may have a shape extended along a parabolic rotor, a hyperbola rotor, or the like about a rotational axis, that is, a taper shape extended along a peripheral surface of a rotor about a rotational axis (input axis) of a curve that changes a distance from the rotational axis in a radius direction as the rotor travels along the rotational axis.

(8) Various modifications and changes can be made in the present invention without departing from the spirit and scope of the present invention described in the claims.

What is claimed is:

1. A gear-type power transmission mechanism comprising:
    a rotational shaft;
    a first gear spline fitted to an outer peripheral surface of the rotational shaft so as to be slidable in an axial direction of the rotational shaft;
    a second gear rotatably fitted to an outer peripheral surface of the rotational shaft and fixed in the axial direction; and
    a dog clutch for freely connecting and disconnecting power transmission between the first gear and the second gear by sliding of the first gear in the axial direction,
    wherein the first gear has a plurality of dog jaws on a side surface of the first gear in the axial direction and the dog jaws protrude toward the second gear, and
    wherein the second gear has a plurality of recess portions to which the dog jaws can be engaged, and
    wherein taper surfaces about a rotational axis corresponding to each other are formed at an end face of each of the dog jaws in the axial direction and each of wall surface portions formed between the recess portions.

2. The power transmission mechanism as claimed in claim 1, wherein taper angles of the taper surfaces are set in a range of 90° to 160°.

3. The power transmission mechanism as claimed in claim 1, wherein taper angles of the taper surfaces are set to approximately 140°.

4. The power transmission mechanism as claimed in claim 1,
    wherein the taper surface of the first gear and the taper surface of the second gear can be formed in a shape extended along a peripheral surface of a cone, a shape extended along a spherical surface about the rotational axis, a shape extended along a parabolic rotor about the rotational axis, or a shape extended along a hyperbola rotor about the rotational axis.

5. The power transmission mechanism as claimed in claim 1,
    wherein the taper surface of the first gear having a shape extended along a peripheral surface of a cone is formed in a shape inclined toward the second gear outwardly in a radial direction about the rotational axis,
    wherein the taper surface of the second gear having a shape extended along a peripheral surface of a cone is formed in a shape inclined outwardly in the radial direction about the rotational axis so as to be moved away from the first gear.

6. The power transmission mechanism as claimed in claim 1, wherein a chamfering portion substantially perpendicular to the rotational shaft is formed outwardly of the taper surface in a radial direction.

* * * * *